April 17, 1962 W. W. KRISTOFF, JR 3,030,454

MAGNETOSTRICTIVE TYPE PHONOGRAPH PICKUP
AND SYSTEM EMBODYING THE SAME

Filed Nov. 13, 1956

INVENTOR
W. W. KRISTOFF JR.
BY C. B. Hamilton
ATTORNEY

United States Patent Office 3,030,454 Patented Apr. 17, 1962

3,030,454

MAGNETOSTRICTIVE TYPE PHONOGRAPH PICKUP AND SYSTEM EMBODYING THE SAME

Walter W. Kristoff, Jr., Chicago, Ill., assignor to Western Electric Company, Incorporated, New York, N.Y., a corporation of New York
Filed Nov. 13, 1956, Ser. No. 621,831
6 Claims. (Cl. 179—100.4)

Figure 1:
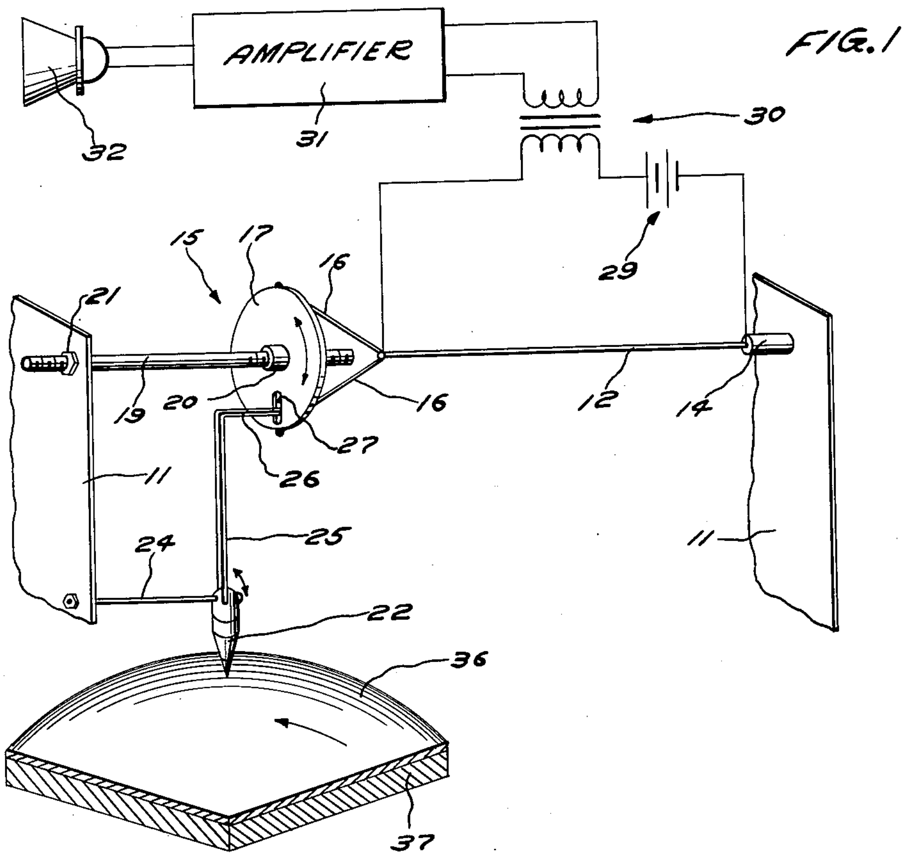

This invention relates to apparatus for reproducing sound and more particularly to an apparatus for reproducing sound which utilizes the magnetostrictive properties of magnetic materials.

In the present invention, the disclosed apparatus is designed for use as a phonograph pickup, but it will be readily apparent from the following description that the underlying principles of the invention are capable of application wherever it is desired to translate force or torque into electrical energy with a high degree of sensitivity or to perform the converse thereof.

It has been found that an application of circular magnetization to an elongated magnetic member will produce a twist in the member and conversely that application of torsional forces to a circularly magnetized elongated member will result in helical displacement of the magnetic field and consequently a varying axial magnetization component. These phenomena are commonly known in the art as the Wiedemann effect and the inverse Wiedemann effect, respectively. It is the latter effect which this invention has been designed to utilize. The aforementioned varying axial magnetization components induce varying currents within the magnetic member and when these varying currents are superimposed upon a constant polarizing current, the result is a pulsating direct current. These variations in the magnitude of the polarizing current may then be translated into electrical signals proportional in strength to the stresses producing them.

It is therefore an object of this invention to provide a magnetostrictive stress-responsive device which is capable of converting mechanical motion into electrical energy.

It is another object of this invention to provide a magnetostrictive stress-responsive device which is capable of utilization as a phonograph pickup.

It is a further object of this invention to provide a mechanical linkage for applying torsional stresses to an elongated magnetic member in accordance with the undulations formed in the sound groove of a phonograph record.

With these and other objects in view, the present invention contemplates a phonograph pickup device including an elongated magnetic member and a circuit for circularly magnetizing the magnetic member. Means are provided for tensioning the magnetic member to distort the circular magnetic field into a helical magnetic field. A movably mounted stylus is connected to the magnetic member for applying torsional stresses to the magnetic member to induce eddy currents due to magnetostriction therein representative of the sound to be reproduced. An audio circuit is inductively coupled to the magnetizing circuit for amplifying the pulsating polarizing current caused by the eddy currents generated in the magnetic member due to magnetostriction and reproducing the sound therefrom.

Figure 2:
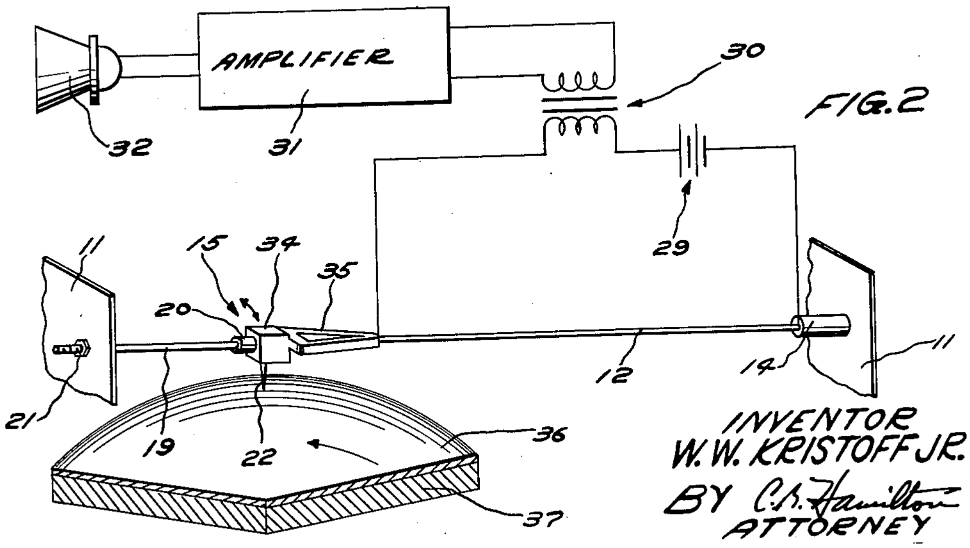

Other objects, advantages, and novel features will become apparent upon consideration of the following detailed description in conjunction with the accompanying drawings wherein:

FIG. 1 is a perspective view of a sound reproduction system embodying the principal features of the invention; and FIG. 2 is a similar view wherein is disclosed a second embodiment of the invention.

Attention now is directed to FIG. 1 of the drawings wherein is disclosed a phonograph pickup head 11 (fragmentary only). An elongated previously magnetized paramagnetic member 12 is positioned between the ends of the pickup head 11 and is secured to one end thereof by means of an insulator 14. The opposite extremity of the magnetic member 12 is secured to a tensioning means, designated generally by the reference numeral 15. This tensioning means comprises rigid supporting arms 16, a torsion disc 17 rotatably mounted on a tension shaft 19 by means of a thrust bearing 20, and a tensioning nut 21.

A stylus 22 is pivotally mounted on a stylus shaft 24 which is fixed to the end of the pickup head 11. The stylus 22 is provided with a torsion arm 25 having an angular extremity 26 thereof projecting into a slot 27 in the torsion disc 17.

The elongated magnetic member 12 is included in a polarizing circuit which also includes a source of polarizing current 29 and the primary side of an audio transformer 30. A utilization circuit is also provided which includes the secondary side of the transformer 30, a suitable amplifier 31, and a loud-speaker 32.

Referring now to FIG. 2 of the drawings, a sound reproduction system is disclosed which is identical to that shown in FIG. 1 except that it utilizes a second embodiment of the tensioning and torsion applying means. The tension shaft 19 and magnetic member 12 are interconnected by means of a stylus holding block 34 and a yoke 35 integral therewith. The block 34 is rotatably mounted on the tension shaft 19 by means of the thrust bearing 20 and the magnetic member 12 is secured to the yoke 35 by any suitable means. The stylus 22 is fixed in the bottom of the block 34 and projects downwardly therefrom to move within grooves formed in a phonograph or other record medium.

*Operation*

In order that a better understanding of the invention may be had, its mode of operation will now be described. A record disc 36 containing the recording to be reproduced is placed upon a turntable 37 which is caused to rotate by any suitable means (not shown). The pickup head 11 is then lowered into the position illustrated in the drawings so that the tip of the stylus 22 enters the record 36 at the outer extremity of a spiral groove having undulations formed therein that are indicative of the sound to be reproduced. As the record 36 and the turntable 37 rotate, the tip of the stylus 22 oscillates in accordance with the undulations in the spiral groove. This causes the stylus 22 and torsion arm 25 to oscillate about the axis of the stylus shaft 24 and in a plane parallel to the torsion disc 17. This motion of the torsion arm 25 in turn imparts proportional oscillatory motion to the torsion disc 17 due to engagement of the sides of the slot 27 by the torsion arm extremity 26. The magnetic member 12, which has been subjected to tension by means of the tensioning means 15, thus has torsional stresses applied thereto due to the rigid connection between the magnetic member and the torsion disc 17. The principal reason for applying tension to the magnetic member 12 is to permit utilization of a fine wire which would not remain stiff due to its own weight. If the wire were not stiff, then it would be extremely difficult to achieve repeatability when applying torsional forces thereto and the reproduction would consequently suffer. Further, use of a thin magnetic member permits direct application of the forces caused by oscillations of the stylus 22 to the magnetic member 12 without the need of any force multiplication devices therebetween.

As the magnetic member 12 twists in response to the application of torsional forces, the variations in the helical magnetic field due to these twists induce eddy currents in the magnetic member 12 which diminish the magnitude of the polarizing current to varying degrees in accordance with the magnitude of the applied stress. This effect results in a pulsating direct current flowing in the magnetizing circuit and consequently through the primary of the audio transformer 30. The pulsating current flowing in the magnetizing circuit is then translated into audible sound by means of the secondary winding of the audio transformer 30, the amplifier 31, and the loudspeaker 32. Thus, the undulations in the spiral groove of the record 36 representing the recorded sounds are translated into audible sound.

It is to be understood that although the apparatus herein described is utilized to reproduce sound, its utility is not limited thereto. It is manifest that numerous modifications of the hereinbefore described apparatus may be made to achieve a similar apparatus which will still be within the spirit and scope of the present invention.

What is claimed is:

1. A magnetostrictive phonograph pickup comprising a pickup head, a torsion responsive magnetized magnetic wire mounted within said pickup head, means for subjecting said wire to a tensional force, a utilization circuit, a battery connected in series with the utilization circuit and the wire for magnetizing said wire about its longitudinal axis, a stylus pivotally mounted on said pickup head, and means interconnecting said stylus and said wire for applying torsional stresses to said wire varying in accordance with movements of said stylus to superimpose magnetostrictive currents on the magnetizing current flowing from the battery.

2. A magnetostrictive stress-responsive device comprising an elongated magnetized magnetic member, a utilization circuit, a source of direct current electrically connected in series with the magnetic member and the utilization circuit for generating a circular field about its longitudinal axis, and means for mechanically applying torsional stresses to the magnetic member.

3. A magnetostrictive stress-responsive device comprising a torsion responsive elongated magnetized magnetic member mounted under tension between spaced apart supports, a transformer having a primary and a secondary winding, an output circuit coupled to the secondary winding, a source of direct current connected in series with the magnetic member and the primary winding of the transformer, a stylus having a tip on one end thereof, a shaft having one end thereof fixed to one of the supports and the other end thereof pivotally connected to the end of the stylus opposite the tip such that the stylus is free to vibrate in a plane perpendicular to the shaft, a torsion arm having one end thereof fixed to the end of the stylus opposite the tip for amplifying movement of the tip of the stylus, and the other end of the stylus in engagement with the magnetic member to impart amplified vibrations of the tip of the stylus to the magnetic member to set up torsional strains and self-induced currents therein in accordance with said vibrations.

4. A phonographic pickup comprising a pickup head having a first and a second parallel spaced apart support, a torsion responsive elongated magnetized magnetic member, an insulator for fixing one end of said member to the first support, a tension shaft having one end thereof fixed to the second support so that the shaft is axially aligned with and spaced from the magnetic member, a torsion disc rotatably mounted upon the tension shaft for rotation in a predetermined plane perpendicular to the tension shaft, said disc having a radial slot normally in a vertical plane passing through said tension shaft, a pair of rigid supporting arms each having one of the ends thereof fixed to the torsion disc in a normally vertical plane passing through said tension shaft and the other ends thereof mutually fixed to the magnetic member so as to impart tension to said member, a utilization circuit, a source of direct current connected in series with the magnetic member and the utilization circuit for magnetizing the magnetic member about its longitudinal axis, a stylus having a tip on one end thereof, a stylus shaft having one end thereof fixed to the second support and the other end thereof pivotally connected to the end of the stylus opposite the tip such that the stylus is free to oscillate in a plane perpendicular to the stylus shaft, and a mechanical amplifying torsion arm having one end thereof fixed to the end of the stylus opposite the tip and the other end thereof being movably disposed within the radial slot of the disc such that oscillations imparted to the tip of the stylus are mechanically amplified and transmitted to the magnetic member to set up torsional strains therein in accordance with said vibration, whereby self-induced currents are superimposed on the magnetizing current and are sensed by the utilization circuit.

5. In a phonographic pickup device, means for mechanically amplifying and transmitting mechanical vibrations to a torsion responsive magnetized magnetic member, which comprises a torsion arm, a stylus having the end opposite the tip fixed to the torsion arm forming a common lever of predetermined length, means for connecting the torsion arm to the magnetic member, and a shaft connected pivotally to the torsion arm between the tip of the stylus and the midpoint of the lever whereby mechanical vibrations imparted to the stylus are amplified and transmitted to the torsion responsive member.

6. In a sound reproducer, a torsion responsive elongated magnetized magnetic member, a utilization circuit, a source of direct current connected in series with the utilization circuit and said member, and a stylus connected to said member for applying torsional stresses to said member to cause self-induced electric currents in said member varying in accordance with the undulations in a sound record.

References Cited in the file of this patent

UNITED STATES PATENTS

| | | |
|---|---|---|
| 233,493 | Field | Oct. 19, 1880 |
| 2,484,960 | Rich | Oct. 18, 1949 |
| 2,491,794 | Bachman | Dec. 20, 1949 |
| 2,511,178 | Roters | June 13, 1950 |
| 2,621,260 | Sykes | Dec. 9, 1952 |
| 2,643,367 | Cruzon | June 23, 1953 |

OTHER REFERENCES

Bates, L. F.: "Modern Magnetism," published 1951, pp. 415, 416.